C. M. DOWNHAM.
COFFEE PERCOLATOR.
APPLICATION FILED JULY 11, 1917.

1,306,688.

Patented June 17, 1919.

WITNESSES
Chas. E. Kemper.
Wm. H. Mulligan

INVENTOR
Cora M. Downham
BY Richard Owen,
ATTORNEY

UNITED STATES PATENT OFFICE.

CORA M. DOWNHAM, OF BELOIT, WISCONSIN.

COFFEE-PERCOLATOR.

1,306,688. Specification of Letters Patent. Patented June 17, 1919.

Application filed July 11, 1917. Serial No. 179,949.

*To all whom it may concern:*

Be it known that I, Mrs. CORA M. DOWNHAM, a citizen of the United States, residing at Beloit, in the county of Rock and State of Wisconsin, have invented certain new and useful Improvements in Coffee-Percolators, of which the following is a specification.

This invention relates to coffee percolators and the primary object of the invention is to provide a device for converting the ordinary coffee boiling pot into a coffee percolator.

One of the objects of the invention is to provide a coffee receptacle adapted to be placed within a coffee pot of the ordinary well known type and held in position whereby the boiling water in the coffee pot will percolate through the coffee receptacle to extract the flavor, the coffee at all times being held suspended midway between the top and bottom of the pot.

A further object of this invention is the provision of a coffee percolator which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which.

Figure 1:
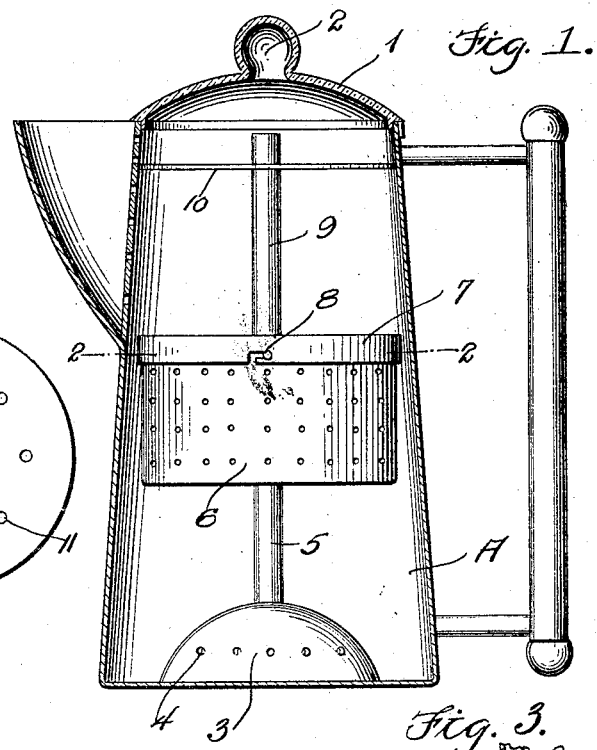
Figure 1 is a side elevation of the attachment showing it applied to the ordinary coffee pot, the latter being in cross section.
Figure 4:
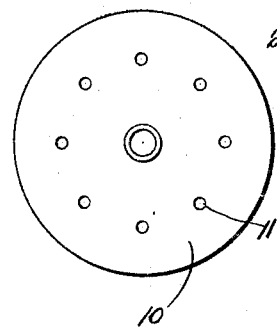
Fig. 4 is a plan of the brace disk.
Figure 2:
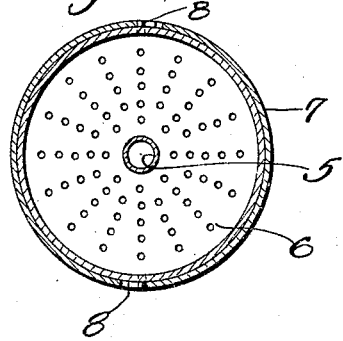
Fig. 2 is a section on the line 2—2 of Fig. 1.
Figure 3:
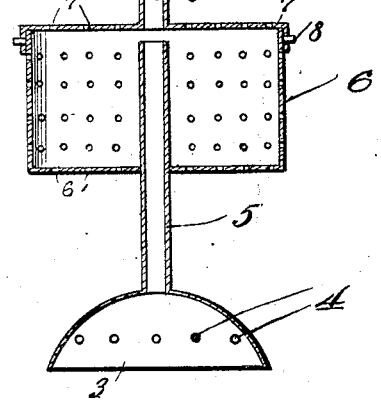
Fig. 3 is a vertical section through the coffee receptacle.

Referring to the drawing, wherein is illustrated the preferred form of my invention, and in which like numerals of reference indicate corresponding parts throughout the several views, the ordinary coffee pot A has its usual cover removed and in place thereof is mounted a transparent cover 1 preferably constructed from glass. This cover is of arcuate formation and its knob 2 is hollow thus providing a bubble dome for the purpose presently described.

A substantially hemispherical base 3 is provided and the same is of hollow construction and provided with a plurality of apertures 4. A hollow pedestal 5 is connected to the base 3 and communicates with the interior thereof and the top of this pedestal supports a coffee receptacle 6. This receptacle is adapted to contain a quantity of coffee, such as ground coffee ready for the preparation of a beverage and the wall of the receptacle is perforated with a series of fine openings as clearly shown in the drawing.

A cover 7 is provided for this receptacle and is held in position by a pin and socket connection 8 of the well known type. The cover 7 is integrally formed with a centrally disposed tube 9 of hollow construction communicating with the interior of the receptacle when the cover is in applied position. The upper end of this tube terminates at the top of the coffee pot directly beneath the bubble dome thereby establishing communication between the hollow base 3 and the top of the pot. For maintaining the tube 9 in position I have provided a brace disk 10 having a plurality of openings formed therein for a purpose presently described. The cover 7 is provided with perforations 7' and the bottom of the receptacle 6 is provided with perforations 6'.

In operation, the coffee will be placed in the receptacle 6 and a quantity of water placed in the pot after which the pot will be placed over a suitable flame until the water boils. The boiling process will cause the water to bubble up through the pedestal 5, and the tube 9 will conduct the steam and vapors up into the dome 1 on the surface of which the steam will be condensed so that the water thus formed will drop back through the openings 11 in the disk 10 and into the receptacle through the perforations in the cover 7. The constant circulation of water through the coffee in the receptacle extracts the flavor from the coffee and this process will continue until the desired strength is obtained.

From the foregoing it will be observed that a very simple and durable coffee percolator has been provided, the details of which embody the preferred form. I desire it to be understood however, that slight changes in the minor details of construction may be made without departing from the spirit of the invention or the scope of the claim hereunto appended.

I claim:

A coffee percolator comprising a coffee pot having a hollow base member mounted in its bottom, a hollow pedestal connected to the said hollow base member and equipped with a coffee receptacle at its upper end, the said hollow pedestal establishing communication between the said base member and the interior of the said receptacle, a perforated cover mounted upon the top of the said receptacle, the latter being disposed approximately midway between the top and bottom of the said coffee pot, a vertically extended tube carried by the said cover and in alinement with the said pedestal, the said pedestal being extended centrally through the interior of the said receptacle to a point adjacent the said cover.

In testimony whereof I affix my signature in presence of two witnesses.

CORA M. DOWNHAM.

Witnesses:
 ISABELLE BIBBINS,
 MAUD SAGE.

Copies of this patent may be obtained for five cents each, by addressing the "Commissioner of Patents, Washington, D. C."